Patented May 23, 1933

1,910,072

UNITED STATES PATENT OFFICE

FRED B. TRACE, OF NATRONA HEIGHTS, AND RUSSELL G. WHITTEMORE, OF BRACKENRIDGE, PENNSYLVANIA, ASSIGNORS TO DUPLATE CORPORATION, A CORPORATION OF PENNSYLVANIA

PROCESS OF TREATING LAMINATED GLASS

No Drawing. Application filed June 2, 1932. Serial No. 615,026.

The invention relates to a process of treating laminated glass to groove out the cellulose plastic around the edge of the plate. Laminated glass ordinarily comprises a pair of sheets of glass cemented to a thin sheet of cellulose plastic, such as celluloid. It has been found desirable to groove out the edges of the plastic sheet for two purposes. First, when it is desired to seal the edge with pitch, varnish, or the like, to protect the plastic from access of moisture, such grooving is necessary; and second, when the sealing operation is not to be used, it involves a substantial advantage to have the plastic grooved out at the edge of the plate, as gumming up of the wheels which subsequently grind the edges, is thus avoided. It has been proposed heretofore to remove the edges of the plastic sheet to provide the groove by exposing such edges to the action of an acid or other similar agent which will not affect the glass, but which will react with the plastic and remove or dissolve it to produce a groove of the desired depth, the product of the decomposition then being washed away. The procedure followed consists in placing a quantity of laminated plates in a rack and then submerging the rack and its contents in a bath of acid or other corrosive liquid suitable for the purpose.

The agent most suitable for the work is sulphuric acid of standard or commercial concentration, namely about 95 percent, having a temperature from 150 degrees F. to 200 degrees F. in order to get a rapid reaction. At such temperatures, with certain types of safety glass, there is a tendency of the treatment to cause certain defects during the period necessary to remove the edges of the plastic to the desired depth. These defects consist in separations, discoloration, and bubbles, and the present invention has for its object the overcoming of this difficulty.

Briefly stated, the remedy consists in submerging the plates in the acid bath as before, and then applying pressure to the bath and its contents. This pressure may be secured by the application of air pressure to the tank containing the acid, or by simply pumping acid into the tank until the desired pressure is secured. A pressure of 100 pounds works satisfactorily, but this pressure may be varied considerably depending on the type of laminated glass being treated. When pressure is thus employed, the tendency to produce the defects in the product above enumerated is eliminated. Further when pressure is used, it is possible to use an acid temperature substantially in excess of 200 degrees F. The treatment at this high temperature permits the time of treatment to be greatly reduced, and this involves not only economy in time, but more important, reduces the heat decomposition in the plastic sheet.

As illustrative of conditions which have produced satisfactory results a grooving of ⅛ inch in depth has been secured using concentrated sulphuric acid at a temperature of 245 degrees F. under 185 pounds pressure per square inch for a period of 15 minutes.

Other acids may be substituted for the sulphuric, the most available being hydrochloric acid having a concentration of about 95 percent. A solution of caustic soda may also be used to react with the plastic, but such solution also reacts to some extent with the glass, so that if this solution is employed, it is desirable to limit the contact of the caustic with the extreme edges of the plates. A solution containing 25 percent caustic may be used at temperatures corresponding to those employed with the acid.

What we claim is:

1. The process of removing the periphery of a cellulose plastic sheet lying between a pair of glass sheets in a laminated plate which consists in submerging the plate in a bath of corrosive liquid which will react with the edges of the plastic sheet to form a soluble reaction product and remove such edges to a point inside the edges of the glass sheets and applying pressure to the bath.

2. The process of removing the periphery of a cellulose plastic sheet lying between a pair of glass sheets in a laminated plate which consists in submerging the plate in a bath of hot corrosive liquid which will react with the edges of the plastic sheet to form a soluble reaction product and remove such edges to a point inside the edges of the glass sheets and applying pressure to the bath.

3. The process of removing the periphery of a cellulose plastic sheet lying between a pair of glass sheets in a laminated plate which consists in submerging the plate in a bath of hot concentrated sulphuric acid which will react with the edges of the plastic sheet to form a soluble reaction product and remove such edges to a point inside the edges of the glass sheets and applying pressure to the bath.

In testimony whereof, we have hereunto subscribed our names.

FRED B. TRACE.
RUSSELL G. WHITTEMORE.